United States Patent [19]

Mallon et al.

[11] 4,445,108

[45] Apr. 24, 1984

[54] PIEZORESISTIVE TRANSDUCERS EMPLOYING THE SPREADING RESISTANCE EFFECT

[75] Inventors: Joseph R. Mallon, Franklin Lakes; Anthony D. Kurtz, Englewood; Timothy A. Nunn, Ridgewood, all of N.J.

[73] Assignee: Kulite Semiconductor Products, Inc., Ridgefield, N.J.

[21] Appl. No.: 425,244

[22] Filed: Sep. 28, 1982

[51] Int. Cl.$^3$ .................................................. G01L 1/22
[52] U.S. Cl. .................................................. 338/4; 73/721
[58] Field of Search .................................... 338/2–5; 73/DIG. 4, 721, 727

[56] References Cited

U.S. PATENT DOCUMENTS 3,079,576 2/1963 Kooiman ............................ 338/4
3,482,197 12/1969 Kondo et al. ...................... 338/4

Primary Examiner—C. L. Albritton
Attorney, Agent, or Firm—Arthur L. Plevy

[57] ABSTRACT

There is disclosed a spreading resistance piezoresistive transducer which employs a planar diaphragm member fabricated from a semiconductor material and having deposited on a surface thereof at least three contact areas. A first contact area is located central to the diaphragm with a second area near the periphery of the diaphragm. A third contact is of a larger area and is positioned between the first and second contacts. A source of biasing potential is applied between the first and second contacts to cause current flow indicative of the spreading resistance between the contacts. The value of the spreading resistance varies in accordance with a force applied to the diaphragm.

12 Claims, 3 Drawing Figures

PIEZORESISTIVE TRANSDUCERS EMPLOYING THE SPREADING RESISTANCE EFFECT

BACKGROUND OF INVENTION

The piezoresistive effect has been widely employed in the fabrication of semiconductor transducers for various applications. Essentially, such transducers utilize a monolithic, integrated circuit Wheatstone bridge formed directly on a silicon diaphragm by solid state diffusion techniques. The prior art fabricates such transducers from many various semiconductor techniques which are used and employed in the integrated circuit art. Essentially, there are two main methods for obtaining an isolated sensor network on a monolithic body. One technique employs PN junction isolation utilizing solid state diffusion and oxide masking. The other technique employs dielectric isolation using silicon dioxide as the dielectric and epitaxially grown silicon as the monolithic structure. Basically, such techniques have been widely employed and both have their inherent advantages and disadvantages. For an example of a technique using PN junction isolation reference is made to U.S. Pat. No. 3,654,579 entitled Electromechanical Transducer and Housing, issued on Apr. 4, 1972 to A. D. Kurtz, et al and assigned to the assignee herein. An example of a structure using dielectric isolation may be had by referring to U.S. Pat. No. 3,800,264 entitled High Temperature Transducer and Housing including Fabrication Methods by A. D. Kurtz, et al and assigned to the assignee herein. As indicated in the above patents as well as many additional patents, there are many configurations and structures which operate with the piezoresistive effect to provide measurements of pressure or forces subjected on a diaphragm or other device associated with the transducer.

It is a primary objective of the present invention to provide a transducer apparatus which operates with the piezoresistive effect but which does not require the fabrication of separate resistive devices. Accordingly, the present invention eliminates many processing steps which are normally employed to fabricate transducers according to the prior art and of the types and kinds indicated above.

BRIEF DESCRIPTION OF THE PREFERRED EMBODIMENT

A spreading resistance piezoresistive transducer comprising a planar diaphragm member fabricated from a semiconductor material and having disposed on a surface thereof at least three contact areas, with a first central contact area, a second outer contact area and a third contact area between said first and second areas, said first and second contact areas adapted to receive a biasing potential to cause current flow between said first contact and third contact and between said second and third contacts indicative of spreading resistances with the magnitude of said resistances varying according to the value of a force applied to a surface of said diaphragm.

DETAILED DESCRIPTION OF THE FIGURES

Before proceeding with a description of the figures, the general concepts of operation will be discussed. Essentially, the device to be described utilizes the spreading resistance effect which is found in semiconductor devices. The spreading resistance occurs due to a patterned current flow which exists in a semiconductor device according to a predetermined contact configuration. As will be described, the device according to this invention relies on current flow which is normal or perpendicular to the plane of the diaphragm. In this manner by using this effect one can provide piezoresistive devices without fabricating discrete resistive elements on a semiconductor diaphragm. In this manner the devices to be described are extremely simple to construct and exhibit reliable operation due to the fact that one avoids the fabrication of separate discrete devices on a common substrate employed as a diaphragm.

Figure 1:
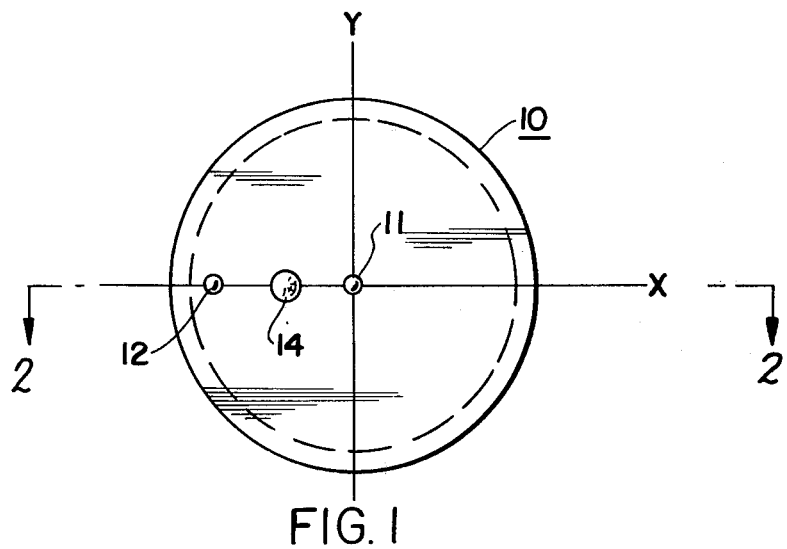
FIG. 1 is a top plan view of the transducer according to this invention.

Referring to FIG. 1 there is a top view of a circular diaphragm member 10. Preferably the diaphragm 10 may be fabricated from a suitable semiconductor such as silicon. It is, of course, understood that other semiconductor substrates may be employed as well. Shown in FIG. 1 are x and y axes. Located at the center of diaphragm 10 is a first contact 11. Contact 11 may be deposited upon the diaphragm 10 by conventional semiconductor techniques as will be described. Located near the periphery of diaphragm 10 and on the same diameter as contact 11 is another contact 12. Positioned between contacts 11 and 12 is a larger area contact 14. As will be explained, there exists a spreading resistance designated as Rsp where one resistance Rspi is between contacts 11 and 14 and is an inner resistance. Another resistance Rspo is positioned between contacts 12 and 14 and is designated as Rspo for outer resistance. Essentially, as is understood, every semiconductor diaphragm has a bulk resistance which basically is given by the following formula.

bulk resistance of the substrate.

$$R_B = \frac{Pl}{A}$$

Where $R_B$ equals the bulk resistance of the substrate.
Where P equals the resistivity of the substrate.
Where l equals the length of the substrate.
Where A equals the area of the substrate.

In regard to the above configuration, the current flow in the diaphragm in the x or the y direction is a function of the applied excitation and the bulk resistance of the diaphragm which is governed by the above equations. In any event, there is also a current flow which is normal to the plane of the diaphragm and essentially, in regard to FIG. 1 is in the z direction. This current flow is governed by the spreading resistance of the contacts. As is well understood, semiconductor devices are associated with piezoresistive coefficients. Such coefficients are tensors and indicated by the specified nomenclature utilizing the symbol $\pi$ with two subscripts. The first subscript is indicative of the direction of current flow while the second subscript is indicative of the direction of the stress. These piezoresistive coefficients have been indicated by many authorities in the field. For example, the complete piezoresistive coefficients for germanium and silicon have been determined by Smith in an article appearing in the *Physical Review*, Volume 94, Page 42, (1954). In order to determine such coefficients, the longitudinal and transverse resistance of single crystal rods subjected to tension were measured. These coefficients have appeared in many other publications. See for example an article entitled "Semiconducting Stress Transducers Utilizing the Transverse and Shear Piesoresistive Effects" by W. G. Pfann and R. N. Thurston, published in the *Bell Telephone Laboratories Review*, May 5, 1961. In regard to the device depicted in FIG. 1, the piezoresistive coefficients $\pi 31$ and $\pi 32$ are of concern. This coefficient is a tensor which governs the magnitude of the piezoresistive coefficient for current flow in the z direction or into the paper and stress in the x or y axis or in the plane of the paper. In regard to the configuration depicted in FIG. 1, there is no stress in the z direction for a force applied normally to the surface of the diaphragm. The stress in the x direction which is radial stress is given as follows:

$$\sigma 1 = \sigma r = \text{radial stress}$$

The stress in the y direction which is the tangential stress is given as follows: $\sigma 2 = \sigma t = \text{tangential stress}$ At the center of the diaphragm the tangential stress is equal to the radial stress. In general terms the resistance change of a bridge is given by the following equation:

$$\frac{\Delta R}{R} = \sigma \times \pi$$

Where $\Delta R$ is the change of resistance.

R is the resistance, $\sigma$ is the stress and $\pi$ is the piezoresistive coefficient. In the case of the diaphragm shown in FIG. 1, a particularly desirable crystallographic orientation is plane of gage (111). The following relationships are applicable for the center gage:

$$\frac{\Delta R}{R} = \sigma 1(\pi 31) + \sigma 2(\pi 32) \text{ but } \pi 31 = \pi 32 = \tfrac{1}{2} \pi 44$$
$$\text{and } \sigma 1 = \sigma 2$$

$$\text{so } \frac{\Delta R}{R} = \tfrac{2}{3} \pi 44 \sigma 1$$

where $\pi 44$ = maximum or shear piezoresistive coefficient

In a typical diffused gage the following relationship determining the operation of the device for a center piezoresistive gage.

$$\frac{\Delta R}{R} = \tfrac{1}{2} 1 \pi 11 = \tfrac{1}{2} \pi 44 \sigma 1$$

For an edge spreading resistance gage the following relationship holds:

$$\sigma 2 = M \sigma 1$$

where
U is Poisson's ratio, typically 0.2

$$\frac{\Delta R}{R} = \sigma 1(\pi 31) + (\sigma 2 \, \pi 32)$$

$$\frac{\Delta R}{R} = .4 \, \pi 44 \, \sigma 1$$

For a typical piezoresistive gage using longitudinal effect in the same position $$\frac{\Delta R}{R} = \tfrac{1}{2} \pi 44 \, \sigma 1$$

Thus, as can be seen from the above, the figure of merit of the device of FIG. 1 which employs the spreading resistance effect is higher than the figure of merit for a similar diaphragm employing diffused sensors. In the configuration shown the radial stress at the edge is equal to 1.5 times the stress at the center.

Figure 2:
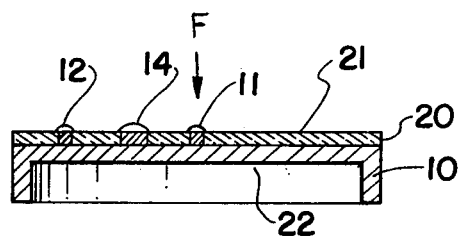
FIG. 2 is a sectional view of the transducer of FIG. 1.

Referring to FIG. 2, there is shown a cross sectional view of a typical device employing the spreading resistance effect. Essentially, the diaphragm 10 is fabricated from silicon and has a thickness of about 1.5 mils. The top surface 20 of the diaphragm 10 is polished and a layer of silicon dioxide 21 is deposited on the surface. Techniques for growing the oxide are well-known in the art. Contact apertures 11, 14 and 12 are formed by suitable photolithographic processing techniques. The contacts 11, 12, and 14 are then formed by a metallization technique so that they interface or contact to the top surface of the silicon diaphragm 10. The dimensions of the contacts are as follows: Contacts 11 and 12 are approximately 0.15 mils in diameter, while contact 14 is approximately 2.5 mils in diameter. The diameter of the diaphragm 10 is typically 0.1 inch. In the configuration shown there exists a spreading resistance Rspo between contact 12 and 14 and another spreading resistance Rspi between contacts 11 and 14. An aperture 22 is found in the bottom surface to define an active deflection area, with contact 11 in the center and contact 12 near the periphery of the active area. These spreading resistors have a value which varies with applied pressure as indicated by the above noted equations and are the sole resistors responsible for current flow in the configuration described. The quiescent value of the spreading resistance is given by the following equation:

$$Rs = \frac{\rho}{2d}$$

Where Rs = the value of the spreading resistance.
Where $\rho$ = the resistivity of the semiconductor, and
d = the diameter of the contact area.

The total resistance between contacts 11 and 14 for instance is given by $RT = Rspi + R_B$
Where $R_B$ is the bulk resistance.

For the above dimension assuming a bulk resistivity of 0.2 ohms - cm and the total resistance between contacts 11 and 14 is 291 ohms. This is comprised of a bulk resistance $R_B$ of 13 ohms, a spreading resistance associated with contact 11 of 262 ohms and a spreading resistance associated with contact 14 of 16 ohms. It can be seen that most of the resistance is associated with contact 14 which is placed at the desirable high stress center location. The high spreading resistance arises because of the small diameter of this contact. Moreover, the resistance is confined near the surface within approximately 1 to 2 contact diameters therefrom. Thus, a high resistance is realized in the high stress area near the top surface of the diaphragm. All of the above results in a high figure of merit for the device.

Figure 3:
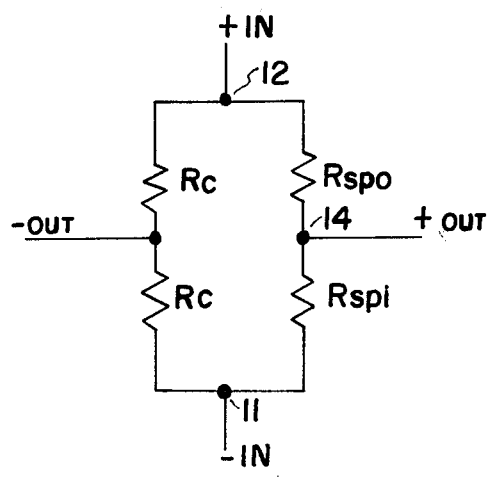
FIG. 3 is a schematic diagram depicting a transducer according to this invention.

Referring to FIG. 3, there is shown a simple schematic of a bridge configuration utilizing the spreading resistance effect. Essentially, bias for the bridge is applied by applying a positive potential to contact 12 which is designated as +in. A negative potential is applied to contact 11 and is designated as −in. One output of the bridge is taken from contact 14 which is designated as −out. The other arm may consist of two equal valued resistors designated Rc. These resistors may be discrete units which are coupled to the terminals 11, 12 and 14 as shown in FIG. 3 which corresponds to contacts 11, 12 and 14. Thus, the transducer depicted makes use of the spreading resistance between the contacts. In this manner, the transducer structure depicted does not have a PN junction and therefore exhibits a relatively linear response with temperature.

This is an important feature of this device. Typical diffused piezoresistive transducers are limited to about 300° F. because of an irreversible degradation of junction isolation. Many complex, expensive and performance limiting techniques have been employed to overcome these problems. For instance, see U.S. Pat. No. 3,930,823 entitled High Temperature Transducers and Housing including Fabrication Methods issued Jan. 6, 1976 to A. D. Kurtz and J. R. Mallon and assigned to the assignee herein.

The invention herein described elegantly and inexpensively overcomes this basic limitation without resorting to exotic and expensive fabrication techniques and is suitable for fabrication of transducers to temperatures in excess of 800° F.

The device is extremely simple to make as there are no requirements for separate resistor deposition, delineation, diffusion, etc., and, hence the structure eliminates the use of complicated masks and other techniques which are employed in the prior art. As indicated above, the figure of merit of such a device is relatively high. As noted from the above formulae the spreading resistance Rs is determined by the resistivity of the semiconductor material which is silicon divided by two times the diameter of the contact. While the diaphragm depicted above was circular in configuration, it is understood that other geometric shapes can be employed as well. Moreover, while the invention is shown as a diaphragm type force transducer in the preferred embodiment, the invention is not intended to be so limited. For instance, spreading resistance piezoresistive elements are equally useful in cantilevered bend beams, columns, strain gage bars and other geometries. Various modifications and alternate designs will become apparent to those skilled in the art when reading the above specification and all such modifications are deemed to be encompassed within the scope of the claims appended hereto.

What is claimed is:

1. A spreading resistance piezoresistive transducer comprising:
a planar semiconductor diaphragm member having disposed on a surface thereof at least two contact areas adapted to receive a biasing potential to cause current flow between said first contact and said second contact with the current flow being primarily limited by spreading resistance of the first contact with the magnitude of said resistance varying according to the value of a force applied to said semiconductor member, with one contact having a substantially greater area than said other contact and with both contacts being of a substantially smaller area than the area of said planar diaphragm.

2. A spreading resistance piezoresistive transducer according to claim 1 further including a third contact positioned at the center of said diaphragm with one contact positioned at the edge and with said greater area contact positioned between said third contact and said other contact on the same line with said third contact and said other contact being of the same area whereby current flow between said third contact and said greater area contact and said other contact and said greater area contact is primarily limited by the spreading resistance.

3. The transducer according to claim 1, wherein said semiconductor is silicon.

4. The transducer according to claim 1, wherein said planar diaphragm member is a circular member of a "coin" like configuration.

5. The transducer according to claim 2, wherein the area of said first and second contacts is relatively equal, with the area of said third contact being substantially greater.

6. The transducer according to claim 3, wherein said first contact area is at the center of said circle, with the second contact area near the periphery, and with said third contact area located on the diameter between said first and second contacts at the midpoint therebetween.

7. The transducer according to claim 1, further including first and second fixed resistors coupled between said first and second contact areas to form a Wheatstone bridge configuration with said fixed resistors being of relatively the same value.

8. The transducer according to claim 1, wherein said spreading resistance of each contact is given by:

$$Rs = \frac{P}{2d}$$

Where
P = resistivity of said semiconductor material.
R = the diameter of said first or second contact areas.

9. The transducer according to claim 2, further including a layer of dielectric material located on said surface of said planar diaphragm.

10. The transducer according to claim 8, wherein the dielectric material is silicon dioxide.

11. A spreading resistance piezoresistive transducer, comprising:
a planar diaphragm member of a circular configuration fabricated from a semiconductor material and having disposed on a surface a first central contact, a second peripheral contact along a diameter end of relatively the same area as said first contact and a third contact located on said diameter midway between said first and second contact and of a larger area than said first and second contacts, said first and second contacts adapted to receive a biasing potential to cause current flow between said first and third contacts and between said second and third contact indicative of spreading resistances with the magnitude of said resistances varying according to the value of a force applied to a surface of said diaphragm.

12. The transducer according to claim 11, wherein said semiconductor is silicon.

* * * * *